United States Patent
Boggs et al.

(10) Patent No.: US 6,240,373 B1
(45) Date of Patent: May 29, 2001

(54) MANAGEMENT METHOD AND APPARATUS FOR REMOTE CABLE-LOCATING TRANSMITTERS

(75) Inventors: Patricia J. Boggs, Conyers, GA (US); Hossein Eslambolchi, Basking Ridge, NJ (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/235,014

(22) Filed: Jan. 21, 1999

(51) Int. Cl.[7] .................................................. H04L 01/14
(52) U.S. Cl. ...................................... 702/188; 340/825.49
(58) Field of Search .............................. 702/188, 59, 123, 702/122, FOR 103, FOR 104, FOR 111–2, FOR 134, FOR 170; 340/825.06, 825.07, 825.16, 825.49, 286.02, 307, 425.1; 324/512, 527, 326, 327, 66–67; 709/200–3, 244

(56) References Cited

U.S. PATENT DOCUMENTS 5,644,237   7/1997   Eslambolchi et al. ............... 324/326

Primary Examiner—Kamini Shah
Assistant Examiner—Edward Raymond
(74) Attorney, Agent, or Firm—Robert B. Levy

(57) ABSTRACT

A plurality of remotely-situated cable-locating transmitters ($14_1$–$14_n$) are centrally managed using a database (18) that stores information about each transmitter, including information about the particular version of its operating software. When a software upgrade becomes available, the database is accessed to identify and select those transmitters that need the upgrade. The upgrade is then communicated to each selected cable-locating transmitter, typically via a dial-up communication links ($27a$–$27d$, $28_1$–$28_n$).

8 Claims, 2 Drawing Sheets

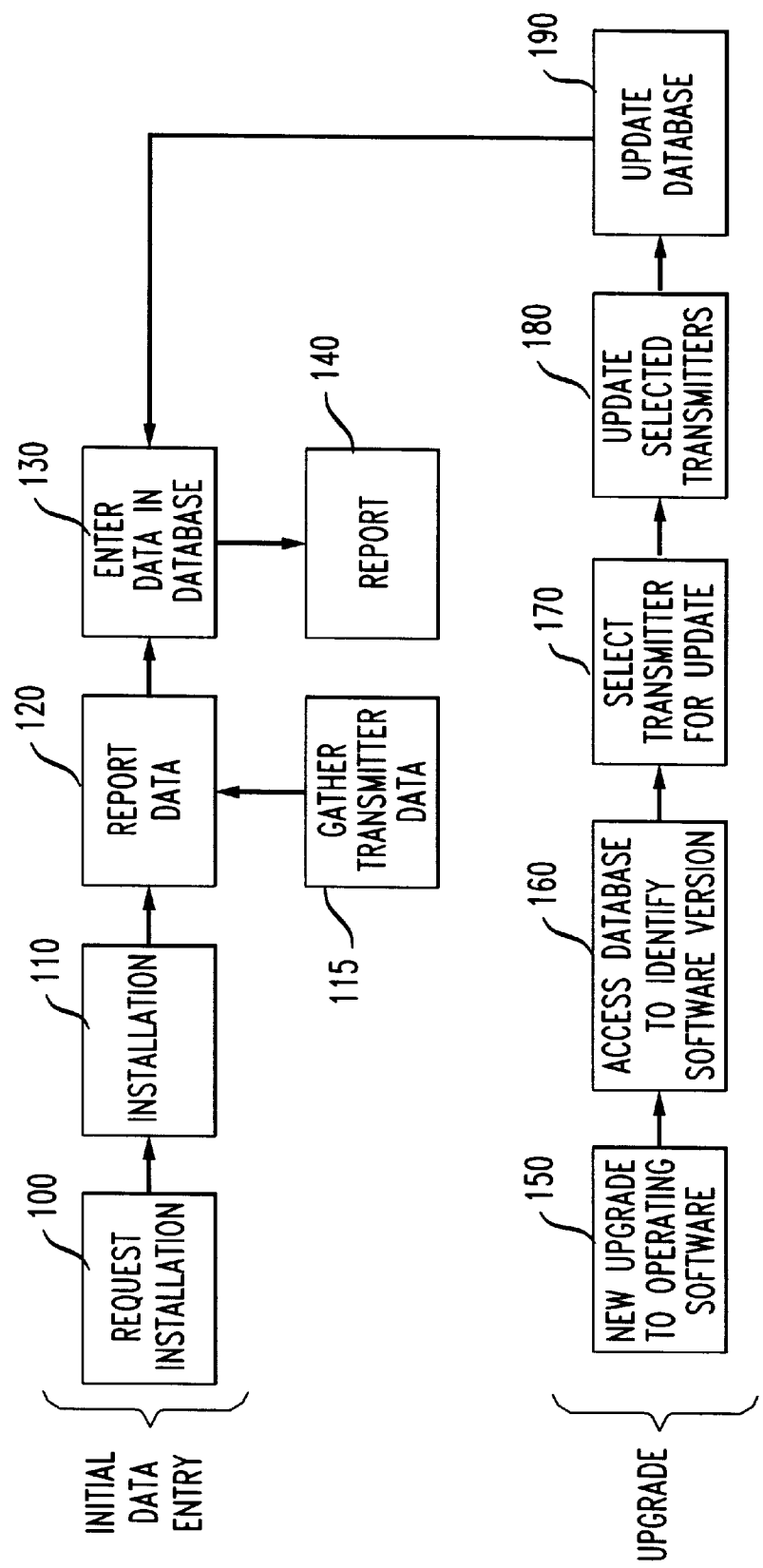

MANAGEMENT METHOD AND APPARATUS FOR REMOTE CABLE-LOCATING TRANSMITTERS

TECHNICAL FIELD

This invention relates to a technique for centrally managing a plurality of transmitters that each provide a cable-locating tone on an associated underground conveyance to assure that each transmitter possesses the most recent upgrade to its operating software.

BACKGROUND ART

Most utilities, such as those that provide electric, water, gas and telephone service, bury their conveyances (i.e., pipes and cables) underground both for reasons of safety and esthetics. Underground burial also protects such conveyances from direct exposure to the elements. Once a utility buries a conveyance, the utility marks the location on a map relative to an existing physical landmark, such as a building, road, or bridge, to facilitate location of the conveyance in the event of a repair. Using a physical landmark as a point of reference incurs the disadvantage that such landmarks can and do undergo change. For example, a building may undergo renovation or even demolition whereas a road may under widening, thus altering the previously existing physical relationship between the landmark and the buried conveyance. Consequently, relying on the physical relationship between a landmark and the conveyance may not always yield an accurate indication of the location of the conveyance.

To facilitate greater precision in the location of their conveyances, utilities often use electromagnetic detection techniques. One such locating technique is disclosed in U.S. Pat. No. 5,644,237, issued in the names of Hossein Eslambolchi and John Huffinan on Jul. 1, 1997 and assigned to the assignee of the present invention. The Eslambolchi et al. '237 patent (hereinafter incorporated by reference) describes and claims a locating technique, whereby a first transmitter impresses a first locating tone on a conveyance to allow a technician to generally locate the conveyance using a signal-locating receiver. Additionally, a second transmitter provides a coded, near DC signal on the conveyance to allow the technician, using a second receiver, to precisely locate the conveyance of interest.

Service providers, such as AT&T, often utilize a large number of transmitters for providing cable-locating tones on their buried conveyances. Often the transmitters are located at remote unmanned facilities, requiring that a technician travel to such a facility to undertake an upgrade of the operating software of the cable-locating transmitter. Thus, to undertake an expeditious software upgrade of all of the cable-locating transmitters associated with a large network of underground conveyances will require a large commitment of personnel so that each transmitter can receive the new operating software typically via an EPROM replacement at within the same time interval. Without committing a large number of personnel, software upgrades will not occur within the same time frame, creating a mix of cable-locating transmitters with different operating software, which is undesirable from a standpoint of network administration.

Thus, there is a need for a technique for controlling the upgrading the operating software each of a plurality of remote cable-locating transmitters.

BRIEF SUMMARY OF THE INVENTION

Briefly, the present invention provides a method for managing a plurality of remotely-situated cable-locating transmitters from a central location, and particularly, for managing the upgrading of the operating software of each transmitter. In accordance with the invention, a database, accessible from the central location, stores information about each cable-locating transmitter, including the identity (e.g., the particular version) of the operating software resident at each transmitter. To manage the cable-locating tone transmitters, the database is accessed, typically upon the release of a new version of the transmitter operating software, to determine which cable-locating transmitter has which version of operating software. Among all of cable-locating transmitters, a set of such transmitters are selected to receive an operating software upgrade based on the version of operating software currently resident at each individual transmitter as identified from the database. The selected set of cable-locating transmitters then each receive a communication from the central location that includes the upgrade of operating system software. Thereafter, the database is updated to reflect the upgrade of operating system software made to each cable-locating transmitter.

The above-described method affords the advantage of upgrading only those cable-locating transmitters not running the latest version of the operating system software. In a large communications network that includes a large number of cable-locating transmitters, there may exist one or more recently installed transmitters that already include the most recent operating system software and thus require no upgrade. Thus, by keeping track in the database of the operating system software running on each cable-locating transmitter, and by accessing the database to determine which transmitters require a software upgrade, the process of managing the transmitters streamlined.

BRIEF DESCRIPTION OF THE DRAWINGS

FIG. 2 is a flow chart diagram of the steps executed by the system of FIG. 1 to manage the cable-locating transmitters.

DETAILED DISCLOSURE

Figure 1:
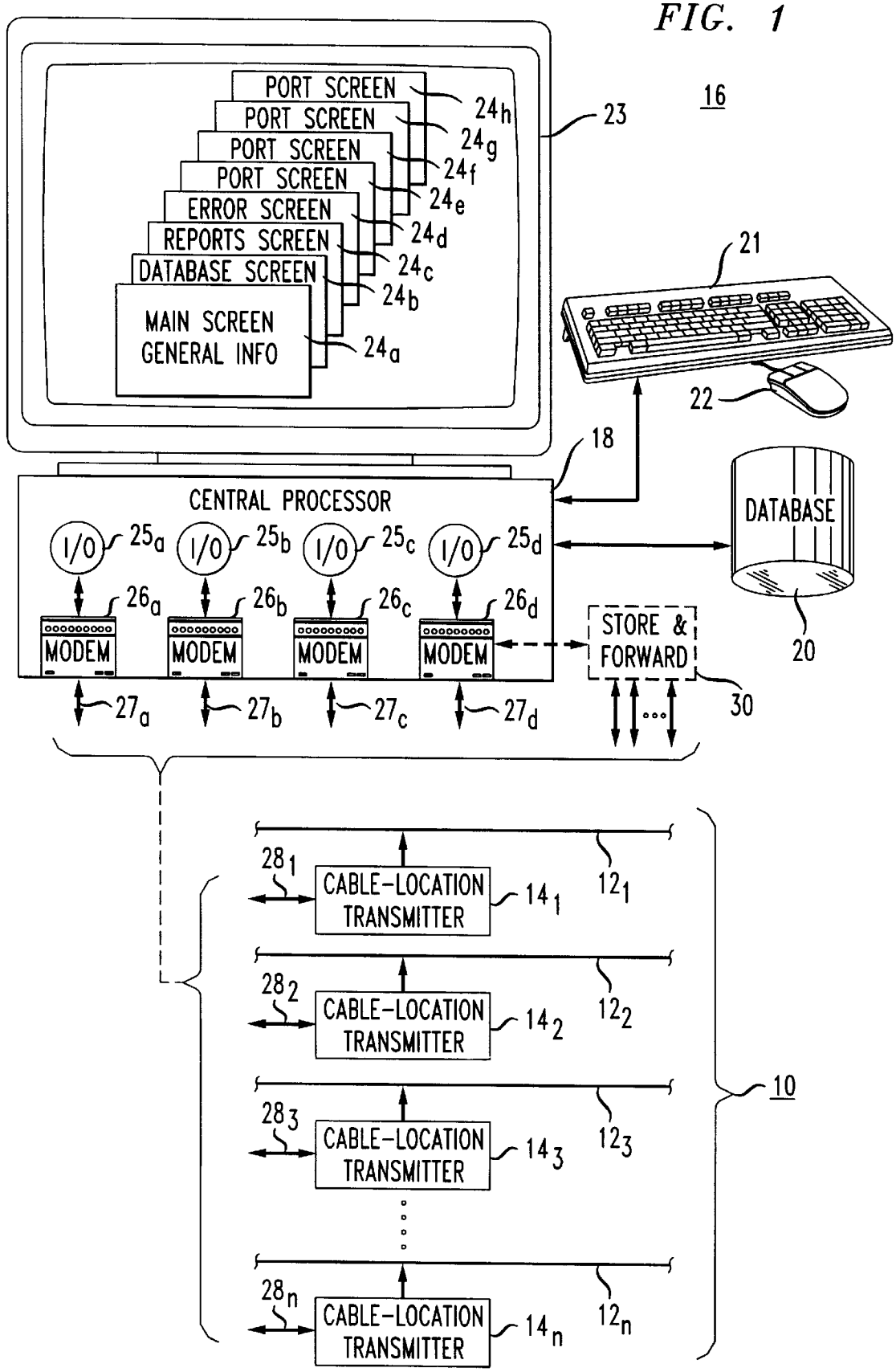
FIG. 1 illustrates a block schematic diagram of a system, in accordance with a preferred embodiment of the invention, for managing a plurality of cable-locating transmitters.

FIG. 1 depicts a network 10 of underground utility conveyances $12_1$–$12_n$ where n is an integer. In practice, the underground conveyances $12_1$–$12_n$ each comprise a buried pipe or cable. For example, the conveyances $12_1$–$12_n$ may comprise buried fiber optic cables for carrying telecommunications traffic, such as the buried fiber optic cables employed by AT&T in its telecommunications network. Each of the conveyances $12_1$–$12_n$ typically carries an electromagnetic locating signal provided by an associated one of cable-locating signal transmitters $14_1$–$14_n$, respectively. The locating tone impressed on each of the conveyances $12_1$–$12_n$ by the corresponding one of the cable-locating transmitters $14_1$–$14_n$ facilitates location of the conveyance by well-known electromagnetic techniques, such as the technique described in U.S. Pat. No. 5,644,237 (hereinafter incorporated by reference).

Each of the cable-locating signal transmitters $14_1$–$14_n$ may take the form of a well-known transmitter, such as the model LMS3 transmitter available from Radiodetection Corp. of Mahwah, N.J. This type of cable-locating transmitter typically includes a microprocessor or the like (not shown) that executes operating system software that controls the transmitter, enabling it to apply the appropriate frequency tone to its associated conveyance. From time to time, upgrades are made to the transmitter operating software to enhance transmitter performance. From the perspective of the operator of the network 10, it is desirable to provide all of cable-locating signal transmitters $14_1$–$14_n$ with the most-recent software upgrade generally simultaneously in the most expeditious manner possible while expending the least amount of resources possible.

To efficiently manage the plurality of transmitters, the network 10 includes a cable-locating transmitter management system 16 in accordance with the invention. The management system 16 includes a central processor 18, typically a personal computer, or the like. Coupled to the processor 18 is a database 20, which, as will be described hereinafter, stores information about the cable-locating signal transmitters $14_1$–$14_n$, including information indicative of the particular version of the operating software resident at each transmitter. While the database 20 is shown separate and distinct from the processor 18, the database could reside on a writable magnetic or optical storage medium contained within the same physical enclosure (not shown) as the processor.

In addition to the processor 18 and database 20, the management system 16 includes a data entry device, such as a keyboard 21 for enabling an operator entering data and/or instructions to the processor and for entering data to the database 20. Additionally, the processor may also include a mouse 22. Further, the management system includes a display 23 for displaying information generated by the processor 18. In the illustrated embodiment, the display 23 has the capability of displaying eight separate screens 24a–24g, respectively. Screen 24a is designated as the main screen and typically displays general information regarding the operation of the management information system 16, including information allowing an operator to select one of the other screens 24b–24g. The screen 24b serves as the "database screen" and typically displays at least one of the records stored in the database containing information about an associated one of the cable-locating signal transmitters $14_1$–$14_n$.

Screen 24c is designated as a "reports" screen and displays different types of reports. For example, the screen 24c could display a report as to how many of the cable-locating transmitters $14_1$–$14_n$ each has a particular version of the operating system software. Screen 24d serves to display a log of errors accumulated by the processor 18. Screens 24e–24h are referred to as "port screens" as each displays information concerning an associated one of input/output (I/O) ports 25a–25d, respectively, of the processor 18. In the event that the processor 18 had additional ports, the display 22 could display additional screens, each associated with such an additional port.

Typically, the I/O ports 25a–25d is linked by an associated one of modems 26a–26d, respectively, to dial-up lines 27a–27d, respectively. The dial-up lines 27a–27d each carry a call initiated by a corresponding one of the modems 26a–26d, respectively, for distribution via a Public Switched Telephone Network (PSTN) (not shown) to a corresponding one of cable-locating transmitters $14_1$–$14_n$ via dial-up links $28_1$–$28_n$, respectively. As will be discussed in connection with FIG. 2, the central processor 18 advantageously communicates via the dial-up links 26a–26d and $28_1$–$28_n$ with the cable-locating transmitters $14_1$–$14_n$ to provide selected transmitters with an operating software upgrade.

Rather than employ separate dial-up links to communicate individually with the cable locating transmitters, the central processor 18 could communicate the software upgrade via a single link to a store and forward facility 30, along with the address information (e.g., telephone number) of each of the cable-locating transmitters destined to receive a software upgrade. The store and forward facility 30 would then communicate such upgrades, preferably simultaneously, to those cable-locating transmitters destined to receive such upgrades.

FIG. 2 illustrates in flow chart-form the steps executed by the cable-locating transmitter management system 16 to manage the cable-locating transmitters $14_1$–$14_n$, and particularly, to manage the software upgrades. Management of existing cable-locating transmitters $14_1$–$14_n$ requires knowledge about the transmitters. In practice, the management process may begin by receipt of an initial request to install a cable-locating transmitter (step 100). For example, the outside plant personnel of a telecommunications carrier, such as AT&T, may receive a request for installation of a buried optical fiber. Such a request will generate a request for installation of an accompanying cable locating-transmitter.

Upon receipt of the installation request, the outside plant personnel will effect installation of the cable locating transmitter (step 110). In connection with the installation, the outside plant personnel will gather the information about the newly installed transmitter (step 115). The data gathered from the transmitter typically includes:

1. the name (i.e., the designation assigned by the carrier or utility for that) of the station or facility that includes the cable-locating transmitter;
2. the telephone number of the dial-up communication link associated with the transmitter;
3. the version of the operating software resident at the cable locating transmitter;
4. the route served by the conveyance associated with the transmitter;
5. the serial number of the cable locating transmitter;
6. the physical location of station that includes the cable locating transmitter; and
7. the date and time of installation After gathering this data, or at least sufficient data to identify the cable locating transmitter and version of its operating software, the outside plant personnel report this data (step 120) to personnel who then enter the data (step 130) in the database 18 of FIG. 1. After entry of the data in the database 18, one or more reports can be generated (step 140) as needed.

The process by which the cable-locating transmitter management system 16 of FIG. 1 accomplishes software upgrades to the cable-locating transmitters $14_1$–$14_n$ will now be described. From time to time, the cable-locating transmitter management system 16 ill receive a new operating software upgrade for the cable-locating transmitters $14_1$–$14_n$ (step 150). After receipt of such an upgrade, the central processor 18 of the cable-locating transmitter management system 16 will access the database 20 (step 160) to identify and select (step 170) which of the cable-locating transmitters $14_1$–$14_n$ require upgrading of their software. In practice, the central 18 will select those cable-locating transmitters whose present operating software is older than the software upgrade.

Not every transmitter may necessarily require updating. For instance, new transmitters that were recently installed during step 110 may already include the most recent software upgrade and thus require no further updating. This, by accessing the database 20, the central processor 18 can identify and select only those cable-locating transmitters $14_1$–$14_n$ needing a software upgrade.

After selecting those cable-locating transmitters $14_1$–$14_n$ needing the operating software update, the central processor 18 will then update the selected cable-locating transmitters $14_1$–$14_n$ by communicating the updated software via one or more of the modems 26a–26d or via the store and forward facility 30. Thereafter, the central processor 18 updates the database 20 during step 190 of FIG. 2 to indicate the version of the operating software provided to each selected transmitter as a result of the upgrade.

The foregoing describes a technique for managing a plurality of cable-locating transmitters $14_1$–$14_n$ so those needing an upgrade of software can be upgraded from a central cite in a efficient manner.

The above-described embodiments merely illustrate the principles of the invention. Those skilled in the art may make various modifications and changes that will embody the principles of the invention and fall within the spirit and scope thereof.

What is claimed is:

1. A method for managing a plurality of remotely-situated cable-locating transmitters from a central location, comprising the steps of:
   (a) storing in a database accessible from the central location information about each of the remotely-situated cable-locating transmitters, including which version of operating software is resident at each said cable locating transmitter;
   (b) accessing said database to identify which version of operating software is resident at each cable-locating transmitter;
   (c) selecting among the plurality of cable-locating transmitters a set of cable locating transmitters to receive an upgrade of said operating software based on the identification of the operating software at said each transmitter;
   (d) communicating to each selected cable transmitter said software upgrade; and
   (e) updating said information stored in said database to reflect said upgrade to said software operating system.

2. The method according to claim 1 wherein the information about each remotely-situated cable-locating transmitter also includes:
   a) a transmitter station;
   b) an address for communicating with the transmitter;
   c) a description of the route served by the conveyance associated with the transmitter;
   d) a serial number for the cable locating transmitter;
   e) a physical location of the cable locating transmitter; and
   f) a date and time of transmitter installation.

3. The method according to claim 2 wherein the address for communicating with the cable-locating transmitter comprises a telephone number of a dial-up link coupled to the transmitter.

4. The method according to claim 3 wherein the selecting step includes the step of identifying those cable-locating transmitters whose operating software is older than the software upgrade.

5. The method according to claim 3 wherein the step of communicating the software upgrade includes the step of dialing the telephone number of the dial-up link coupled to the transmitter.

6. Apparatus for managing a plurality of remotely-situated cable-locating transmitters from a central location, comprising:

a database accessible from the central location information about each of the remotely-situated cable-locating transmitters, including which version of operating software is resident at each said cable locating transmitter;

a processor for (a) accessing said database to identify which version of operating software is resident at each cable-locating transmitter; and (b) selecting among the plurality of cable-locating transmitters a set of cable locating transmitters to receive an upgrade of said operating software based on the identification of the operating software at said each transmitter and (c) updating said information stored in said database to reflect when an upgrade is made to said software operating system; and communication means coupled to the processor and communicating with each selected cable transmitter to supply said software upgrade thererto.

7. The apparatus according to claim 6 wherein the communication means includes at least one modem for communicating a software upgrade to at least one of said selected cable locating transmitters.

8. The apparatus according to claim 6 further including a store and forward apparatus for communicating said software upgrade to all of said selected cable-locating transmitters.

* * * * *